United States Patent
Tourrilhes et al.

(10) Patent No.: US 11,502,965 B2
(45) Date of Patent: Nov. 15, 2022

(54) BURST PACKET PRELOAD FOR ABW ESTIMATION WITH RATE LIMITERS

(71) Applicant: HEWLETT PACKARD ENTERPRISE DEVELOPMENT LP, Houston, TX (US)

(72) Inventors: Jean Tourrilhes, Milpitas, CA (US); Puneet Sharma, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/016,329

(22) Filed: Sep. 9, 2020

(65) Prior Publication Data
US 2022/0078127 A1    Mar. 10, 2022

(51) Int. Cl.
*H04L 47/30* (2022.01)
*H04Q 11/00* (2006.01)
*H04L 47/28* (2022.01)

(52) U.S. Cl.
CPC .............. *H04L 47/30* (2013.01); *H04L 47/28* (2013.01); *H04Q 11/0066* (2013.01); *H04Q 2011/0064* (2013.01)

(58) Field of Classification Search
CPC ......... H04L 47/30; H04L 47/28; H04L 47/25; H04L 47/283; H04L 47/18; H04Q 11/0066; H04Q 2011/0064
See application file for complete search history.

(56) References Cited

U.S. PATENT DOCUMENTS

| | | | |
|---|---|---|---|
| 8,503,320 B2 | 8/2013 | Ekelin et al. | |
| 9,270,568 B2 | 2/2016 | Flinta et al. | |
| 10,225,199 B2 | 3/2019 | Beliveau et al. | |
| 2008/0049629 A1* | 2/2008 | Morrill | H04L 43/08 370/250 |
| 2008/0225709 A1* | 9/2008 | Lange | H04L 45/50 370/230 |
| 2008/0253301 A1* | 10/2008 | Keromytis | H04L 47/10 370/252 |
| 2013/0058248 A1* | 3/2013 | Singh | H04L 43/0876 370/252 |

(Continued)

OTHER PUBLICATIONS

Paul A.K. et al., An Enhanced Available Bandwidth Estimation Technique for an End-to-end Network Path (Research Paper), IEEE Transactions on Network and Service Management, Dec. 2016, pp. 768-781,vol. 13, Issue 4, IEEE.

(Continued)

*Primary Examiner* — Dhairya A Patel
(74) *Attorney, Agent, or Firm* — Sheppard Mullin Richter & Hampton LLP

(57) ABSTRACT

Systems and methods are provided for performing burst packet preloading for Available Bandwidth (ABW) estimation, that may include: preparing a chirp train to be used for ABW estimation, the chirp train comprising a quantity of original probe packets; determining a quantity of additional probe packets that will transition the network path from a short-term mode into a long-term mode; inserting the determined quantity of additional probe packets at the beginning of the chirp train; and transmitting the chirp train, including the determined quantity of additional probe packets on the network path, to a receiver that can perform ABW estimation of the network path.

20 Claims, 7 Drawing Sheets

(56) References Cited

U.S. PATENT DOCUMENTS

| | | | | |
|---|---|---|---|---|
| 2015/0333993 A1* | 11/2015 | Welin | ............... | H04W 24/08 |
| | | | | 370/252 |
| 2016/0057065 A1* | 2/2016 | Briscoe | ............... | H04L 47/31 |
| | | | | 370/235 |
| 2019/0158437 A1* | 5/2019 | Gong | ............... | H04W 8/04 |
| 2019/0379591 A1* | 12/2019 | Boughzala | ............... | H04L 47/115 |
| 2020/0092190 A1 | 3/2020 | Oshiba et al. | | |
| 2022/0078127 A1* | 3/2022 | Tourrilhes | ............... | H04L 47/30 |

OTHER PUBLICATIONS

Paul A.K. et al., NEXT: New Enhanced Available Bandwidth Measurement Technique, Algorithm and Evaluation (Research Paper), 2014 IEEE 25th Annual International Symposium on Personal, Indoor, and Mobile Radio Communication (PIMRC), Sep. 2-5, 2014, pp. 442-447, IEEE.

* cited by examiner

BURST PACKET PRELOAD FOR ABW ESTIMATION WITH RATE LIMITERS

DESCRIPTION OF RELATED ART

Available bandwidth measurement is an essential part of any network traffic engineering solution, including those for Software-Defined Wide Area Network (SDWAN) solutions. Usually a traffic engineering solution needs to know how much spare capacity is available on each network path before deciding where to place/route and load balance the network traffic.

PathChirp is a conventional method to perform available bandwidth estimation, and one of the more widely used due to the fact that it has an open source implementation. PathChirp estimates the available bandwidth of a network path using the probe rate model (PRM). PathChirp sends a periodic probe train. A probe train is a sequence of probe packets sent with specific time interval between probe packet departures. The time intervals between packets define an instantaneous rate, and the network will react to that rate by either leaving that interval mostly unchanged or spacing out the packets. In PathChirp, the probe rate is increased over the probe train by reducing the time interval between adjacent probe packets.

PathChirp measures the relative one way delay of each probe packet in the train, and tries to find the inflection point where the delay goes from relatively constant to consistently increasing, indicating congestion in the path. The probe rate associated with the inflection point is taken as the main basis for the available bandwidth estimate.

PathCos++ is another conventional technique for available bandwidth estimation. PathCos++ estimates the available bandwidth of a network path using the probe rate model (i.e. self congestion). PathCos++ sends a periodic probe train. A probe train is a sequence of probe packets sent with specific time intervals between probe packet departures. The time interval between two packets defines an instantaneous rate, and the network will react to that rate. In PathCos++, the probe rate is decreased over the probe train by increasing the time between probe packets, this creates congestion and then relieve gradually this congestion.

PathCos++ measures the relative one way delay of each probe packet in the train, and tries to find a pair of packets which have similar one way delay on both sides of the congestion peak, which means that those packets have similar congestion. It tries to find the widest spaced packet pair, and then computes the average received rate of probe packets between the two packets of the packet pair. The average received rate is used as the available bandwidth estimate.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
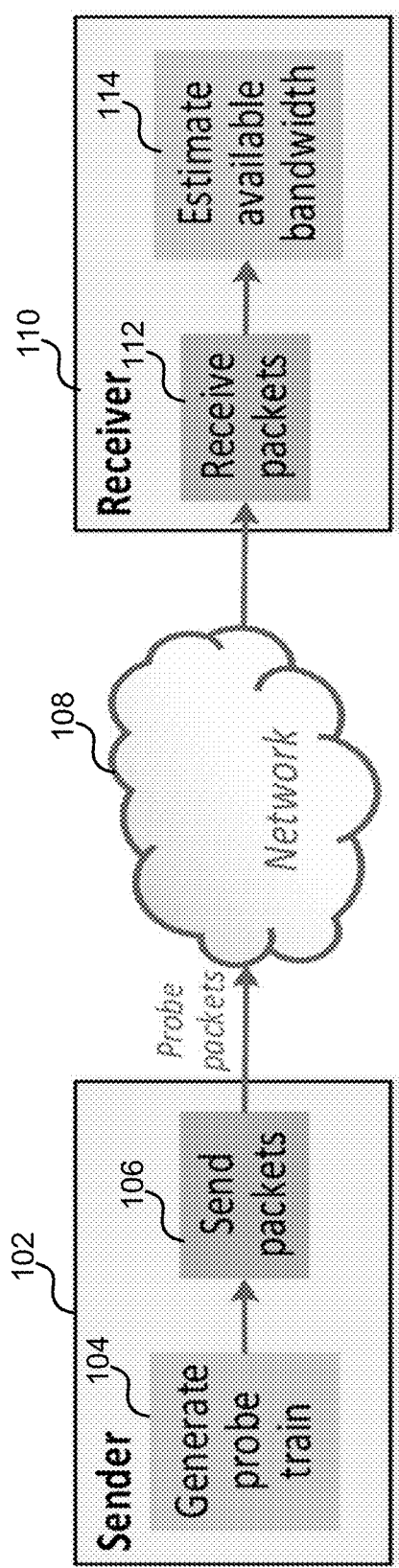
FIG. 1 illustrates an example environment for active end-to-end probing in accordance with embodiments.

The figures are not exhaustive and do not limit the present disclosure to the precise form disclosed.

DETAILED DESCRIPTION

Available bandwidth measurement is an important part of any network traffic engineering solution, including those for Software-Defined Wide Area Network (SDWAN) solutions. In a closed system, it is possible to collect direct measurements on each of the network devices on the paths of the traffic. However, in many cases it is not possible to use direct measurements because, for example, the network devices may be in a different administrative domain, or may be hidden by tunneling or encapsulation. This is the case for SDWAN, where the SDWAN gateway tries to direct traffic to the best path over the Internet.

When direct measurements are not possible, available bandwidth estimation may be performed from two endpoints that can be controlled/used for measurements. This is usually accomplished by probing the network path with specially crafted probe packets sent from one end of the path to the other end of the path. The receiver end measures the receive time of the packets and the changes to the packet delay/time pattern to estimate the path characteristics, such as the path capacity, the available bandwidth and/or the bulk transfer capacity.

PathChirp, PathCos++ and Self-Loading Decreasing Rate Train (SLDRT) are some of the conventional methods for estimating the available bandwidth of a network path, and are based on the Probe Rate Model (PRM). The PRM model is based on creating temporary congestion on the network path and measuring the increase in queuing delay of probe packets to infer when the path is congested. By determining when the path is congested and when it's not, those methods can then compute an estimate of the available bandwidth (ABW). The PRM model assumes that the network path is stateless and its capacity invariant. However, most rate limiters violate this assumption, they enforce a long-term rate, however if the link has been underutilised, a burst of packet may be sent at a rate much higher than the long-term rate. In most cases, this bursting confuses PRM methods and cause overestimation of the available bandwidth.

Networks connect a number of endpoints, for example clients or servers. Many networks are built such that there are multiple possible paths from one endpoint to another. Having multiple paths between endpoints usually improves the resilience to failure, and may increase the network capacity.

Network traffic engineering looks at the property of network traffic and the network elements and their connectivity to both help design the network and direct traffic onto different paths in that network. Proper traffic engineering helps to increase the network performance and lower its cost.

One of the simplest forms of network traffic engineering is to have a primary link and add a backup link to be used in case of failure of the primary link. Multi-rooted trees, such as fat trees, are topologies which offer many parallel paths, they have been extensively studied, and many approaches have been proposed to load balance packets on such topologies. The Internet is a more complex network, is split across many entities and administrative domains, and therefore traffic engineering is much more complex. On the Internet, usually each entity does fairly advanced traffic engineering within its own domain, and cross domain interactions are managed through Border Gateway Protocol (BGP) routing which allows only for fairly coarse traffic engineering.

Most techniques for traffic engineering are composed of three parts. The first part is measurement, where some attributes of the traffic and/or network are measured. The second part is optimization, where and optimal distribution of traffic is computed. The third part is control, where the network is reconfigured to implement the desired distribution of traffic.

Embodiments disclosed herein include systems and methods to provide an available bandwidth estimation in a timeframe much shorter than such estimates can be provided using conventional techniques. Embodiments may be configured to pre-load the rate limiter to force the rate limiter into its long-term mode. As a result, this reduces overestimation of ABW due to rate limiter bursting and improves ABW estimation accuracy.

To preload the rate limiter, the system embodiments may be configured to inject extra packets ahead of the chirp train, which may be used by the ABW estimation on the receiver. This can be done with minimal increase of the size of the actual chirp train. These preloaded packets are used to put the rate limiter in its long-term state, and may be used for ABW estimation.

Embodiments may provide an improvement over conventional solutions in that they may be configured to reduce ABW overestimation when the network path presents capacity fluctuations due to rate limiter bursting, a traffic policer or a traffic shaper. In various aspects, the ABW estimation is no longer influenced by the short-term behavior of the network path and is instead based on the long-term behavior of the network path.

Embodiments may be implemented in various network applications, including in or Defined Networking (SDN) and in SDWAN networks. SDN is an approach for managing networks. SDN defines APIs which allows to decouple the datapath (packet forwarding) and the control plane (protocol intelligence) of network elements. In other words, a network controller, an entity outside the network element, can have fine grained control and visibility over that network element. This can be used by the network controller change the policy of network elements dynamically, or to centralize the control plane and decision making of the network.

The SDN approach is also very well suited for network traffic engineering. The SDN APIs usually define both measurement and control, and this enables the network controller to measure the network and dictate a distribution of traffic.

One of the limitation of SDN is that it assumes a tight coupling between the network controller and the network elements. This can work at small to medium scale, but usually won't scale to larger networks. Its efficiency also is diminished if the network between the network controller and network elements has limited performance (low bandwidth or high latency). Moreover, the SDN approach usually does not allow to cross administrative domain boundaries, because different entities can only trust controlled and limited interactions between each other.

Most organizations are distributed across multiple physical locations. As a consequence, their network is typically composed of set of Local Area Networks (LANs) supporting the local physical locations of the organization and a set of Wide Area Network (WAN) links connecting those local networks to each other.

For example, a large bank or retailer may have multiple physical locations and branches. Each location or branch has a set of LANs. In a traditional configuration, all the branches and locations connect to a few central locations using dedicated WAN links (usually MPLS), and the few central locations connect to the internet using some WAN links. Those dedicated WAN links are provided by telecom companies, they offer high availability and quality of service guarantees but have a high monetary cost.

SDWAN proposes to use SDN principles to manage WAN connectivity. This can offer centralized visibility and control over the WAN connectivity of the company. Another goal may be to reduce cost of WAN connectivity. One way SD-WAN reduces cost is to replace those dedicated WAN links by tunnels over the Internet. In this case, each branch and location has WAN links connected to the Internet, usually using a cheap consumer WAN technology such as DSL, CableModem or Wireless 3G. A special SD-WAN gateway in each branch and location creates private tunnels (VPN) to connect securely to other branches and locations over the WAN links and the Internet.

Replacing the dedicated WAN links enables reduction in the cost of WAN connectivity, however consumer WAN technology and the Internet typically does not provide the same high availability and quality of service guarantees as legacy dedicated WAN links. A common way SD-WAN solutions deal with this issue is for the SD-WAN gateway in each branch and location to have multiple WAN links to the Internet. The SD-WAN gateway implements tunnel handoff, it creates parallel tunnels over the Internet using each WAN link, and then uses network traffic engineering to direct traffic to the most appropriate Internet tunnel with the goal of optimally using the available network capacity.

For example, if the SD-WAN gateway detects that a WAN link is down, it will direct traffic away from that WAN link to a tunnel not using that particular WAN link.

The SD-WAN gateway can perform more advanced traffic engineering. For example it can monitor the performance of each Internet tunnel, in terms of latency and throughput, and then load balance traffic, or map each traffic type to the most appropriate Internet tunnel for that traffic. A key component of such traffic engineering is a way to measure the performance of each Internet tunnel. Each tunnel defines a network path across the Internet, the tunneled packets are processed by a number of network elements. The network path used by a tunnel (outside the tunnel) and the network path within a tunnel are logically different (they have different addresses), however those two network paths go through the same network elements, they have in most cases almost the same performance and their performance characteristics are strongly correlated. Therefore, measuring the performance of an Internet tunnel can be done by measuring the network path outside or inside the tunnel, and for this invention we consider they are the same network path.

A direct measurement or a SDN approach cannot be used for those network paths, because the vast majority of the network elements of an Internet path are in different administrative domains (the various ISPs on the path), and it would be very difficult to get the complete list of all those elements (which in most case is dynamic) and administrative access to them.

For those reasons, path measurement is done via end-to-end network path estimation techniques, by sending probe packets from one end to another. FIG. 1 illustrates an example environment for active end-to-end probing in accordance with embodiments.

With reference now to FIG. 1, in this example a sending node 102 generates a probe train 104 consisting of probe packets, and sends the probe packets at 106 across a network path 108 to a receiver 110. Receiver 110 receives the probe packets at 112 and uses the received probe packets at 114 to estimate the available bandwidth. In various embodiments, the probe packets are only used to estimate available bandwidth and do not carry actual data, beyond the data payload required for the network path estimation itself.

Available bandwidth measurement is usually a critical component of network traffic engineering. There are many cases where direct measurement of network elements is not possible, usually because they are in a different administrative domain. In those cases, it is usually possible to perform end-to-end available bandwidth estimation instead. Network traffic engineering may use other properties of the network path. Similarly, those properties can't be measured directly, and additional network path estimation must be performed.

It is also possible to do passive measurements, either by only measuring delays experienced by existing data transmitted on the network path, or modulating that data to have specific characteristics. Another variation is single-ended measurement where the technique uses some way to get probe packets reflected back to the sender.

Different techniques may estimate different properties of the network path. Bandwidth estimation is a subset of network path estimation. Path capacity is the maximum amount of traffic bandwidth that can be sent if the network path is idle, i.e. without any competing traffic. Available bandwidth (ABW) is the remaining/residual path capacity, i.e. the capacity not currently used by other traffic. Bulk Transfer Capacity (BTC) is the bandwidth a TCP connection would get if placed on this network path. Latency is the one way delay from sender to receiver, and round trip time (RTT) is the two way delay.

With active probing, the sender sends a series of specially crafted probe packet patterns, the packet pattern is defined by the estimation technique and designed to trigger specific behaviors from the network elements on the network path. For example, in many cases the packet pattern is a probe train, the packets and interval between packets are intended to probe various bandwidths across the packet pattern. The receiver measures the received time of the packets, may compute the one way delay of each packet (i.e. the time taken by a packet to reach from sender device to receiver device) and examine the changes to the packet pattern. The estimation technique uses a simplified network model to convert those measurements into estimates of various network path characteristics.

There are two main classes of bandwidth estimation techniques, those using a probe gap model and those using the probe rate model. For the probe gap model, the assumption is that two closely sent packets will see the gap between them increase in proportion to the load on the most loaded queue, due to queuing delay on that queue. For the probe rate model, the assumption is that when packets are sent at a rate lower than the bottleneck bandwidth, the traffic pattern will be mostly unchanged, whereas when packets are sent at a rate greater than the bottleneck bandwidth, those packet will suffer extra queuing delay due to congestion.

In practice, the aforementioned techniques generally infer network path congestion by estimating variations in the queuing delay experienced by the packets at different network elements in the network path. The queuing delay is one of the components of the packet one way delay through the network path. Those techniques compare the one way delay of various probe packets to estimate the variations in the queuing delay. For example, with the probe gap model, two packet may be sent at a known sending interval. The measured receiving interval is assumed to be the sum of the sending interval and the difference in queuing delay between the packets.

Figure 2:
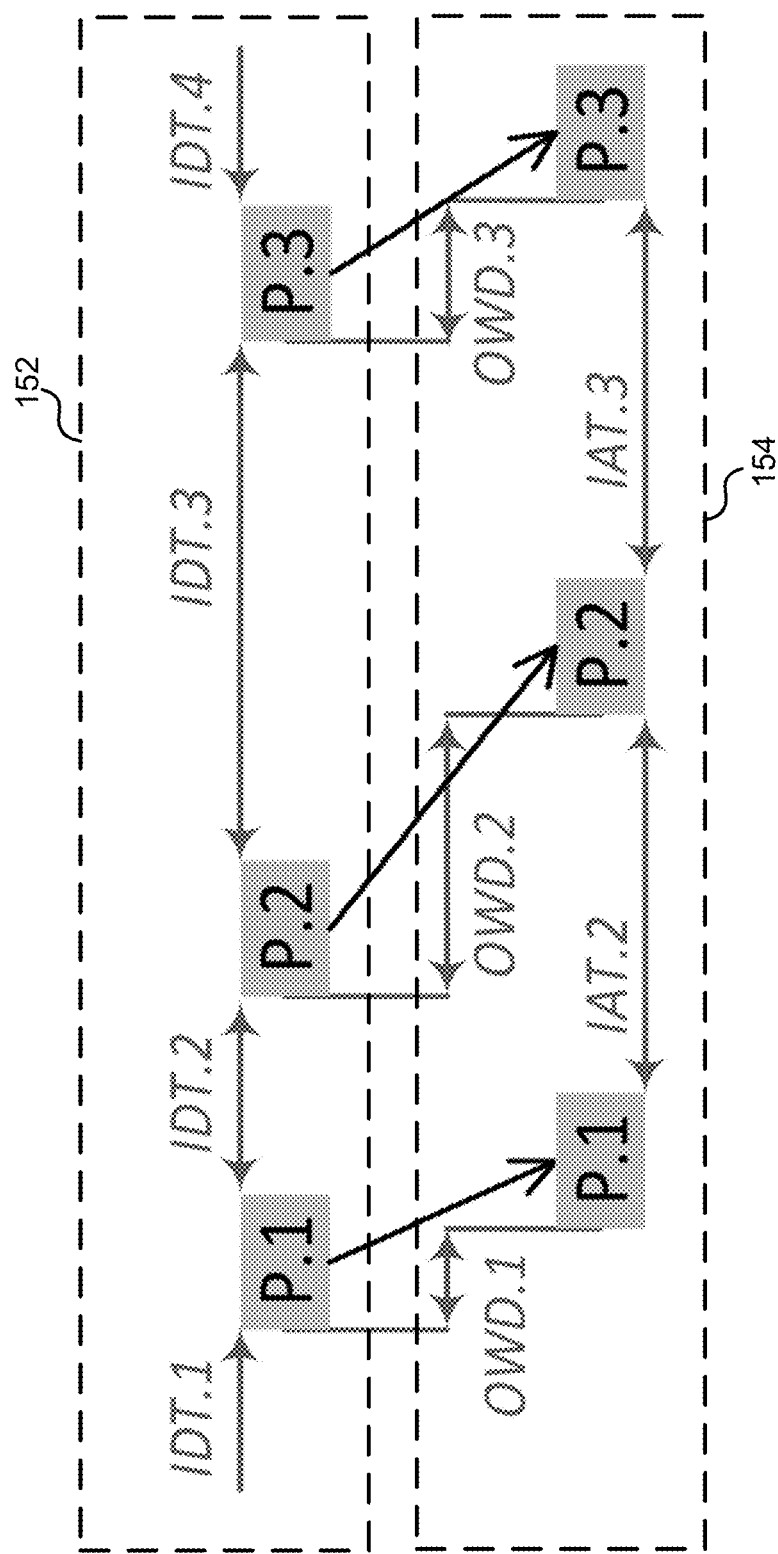
FIG. 2 illustrates some of the parameters that may be used for delay measurements.

FIG. 2 illustrates some of the parameters that may be used for delay measurements. In the example of FIG. 2, a sending node 152 is sending a plurality of packets P.1, P.2, P.3 to a receiving node 154. The transfer can be characterized by a plurality of timing characteristics, IDT, OWD and IAT. These are now described.

The vast majority of network path estimation techniques must send packets in a very controlled manner so that congestion can be accurately probed. In general, techniques try to create a specific pattern of packets, with specific time intervals between packets. The interval between packets defines an instantaneous rate being probed, and the network path will react to that probed rate. For each packet, the Inter Departure Time (IDT) is the amount of time between sending the previous packet and sending the current packet. The IDT can be computed from the desired probing rate:

$$IDT = \text{Packet-Size}/\text{Probed-Rate}$$

In the case of PathCos++ and SLDRT, the IDT of packets is exponentially increasing, which means each packet interval is probing exponentially decreasing probing rates.

The sender can rarely if ever be totally accurate in sending packets, so the actual IDT of the packet may be different from the desired/theoretical IDT. It is possible to modify most techniques to measure the actual IDT.

Embodiments may be implemented using either the desired IDT or the actual IDT, but may generally be expected to yield better results with the actual IDT.

Estimation techniques generally measure when packets are received. For each packet, the Inter Arrival Time (IAT) may be defined as the amount of time between receiving the previous packet and receiving this packet. From the IAT, the instantaneous per-packet received rate can be computed as:

$$\text{Received-Rate} = \text{Packet-Size}/IAT$$

The overall IAT (oIAT) is the difference of received time between two non-adjacent/consecutive packets.

The One Way Delay (OWD) is the time difference between when the packet was sent (sent time) and when it was received (received time). Conventional techniques generally compare the OWD of multiple packets. The One Way Delay of a packet is generally governed by the propagation delay of the network path, the transmission time of the slowest link of the path, and the accumulated queuing delay in all the network elements in the path. For each packet, OWD may be characterized as:

$$OWD(i) = pd + st(\text{size}) + \text{sum}(qd(e,i))$$

With:
 pd→total propagation delay
 st(size)→slowest transmission time for this packet size
 qd(e,i)→queuing delay at element e for packet i Conventional network path estimation techniques assume a fairly simple queuing model where $qd(e,i)$ is a function of the congestion at element e when packet i arrives. The sender and receiver use different clocks to measure packet departure and arrival, and these clocks might not be perfectly synchronized. Therefore, it is generally challenging to accurately measure the OWD of packets. Fortunately, in most cases, the absolute OWD of a packets does not matter and only the difference between the OWDs of different packets matters. Over the short time of a probe train, clock drift is negligible, and therefore the difference between OWDs can be accurate enough.

In various embodiments implementing PathCos++, the system may not rely on the absolute OWD, but may instead use a relative OWD. In such embodiments, for each packet the relative OWD used by PathCos++ is the measured OWD of that packet, minus the OWD of the first packet. This relative OWD estimate the extra queuing delay of a packet (respective to the first packet), and may be negative.

If there is no packet losses and no packet reordering, packets may be sent and received in the same order. In this case, the IAT, IDT and OWD of each packets are directly related. If OWDp is the One Way Delay of the previous packet, and OWDc the One Way Delay of the current packet, the IAT may be given by:

$IAT = OWDc - OWDp + IDT$

PathChirp relies on what is referred to as the Excursion Detection Algorithm (EDA). The EDA detects an inflection point, which is a point at which the network path becomes fully congested. The EDA also finds periods of temporary congestion in the part of the probe train before the inflection point. The concept behind the EDA is that an increase in OWD in the probe train usually indicates increased congestion in the network path. The EDA uses those OWD increases to detect both temporary congestion and full congestion.

In operation, the EDA analyzes the relative OWD of packets, and compares the OWD of a packet to the OWD of the previous packet. If the OWD of a packet is greater than the OWD of the previous packet, the EDA marks this packet as the potential start of an excursion. Moving forward in the probe train, the EDA tries to find a packet for which the OWD is sufficiently lower than the OWD of the packet at start of the excursion. If such packet is found, it is marked as the end of the potential excursion. Then, the EDA filters out those potential excursions. If a potential excursion is deemed too small, it is ignored. If it is large enough, the probed rate associated with the packets in the excursion are used in the computation of the available bandwidth.

If no end of excursion is found, i.e. the OWD never decreases enough, then the start of that final excursion is used as the inflection point. The probed rate associated with the packet at the inflection point is the main basis for the computation of the available bandwidth.

PathCos++ and SLDRT, on the other hand, use the Bump Detection Algorithm (BDA) to select a pair of packets with similar congestion on both sides of the congestion peak. The pair of packets selected is then used to estimate the available bandwidth, therefore the quality of the available bandwidth estimate is only as good as the selection of those packets by the BDA.

The probe train has a decreasing rate, therefore it first creates congestion of the network path (rate higher than the bottleneck), and then decongests that network path (rate lower than the bottleneck). This means that across the probe train, first the OWD of packets goes up (congestion) and then down (decongestion). A big bump in OWD represents the time of maximum congestion, and packets with similar OWD should have experienced similar congestion (similar amount of queuing).

The BDA selects packets of the same congestion period. If they are not part of the same congestion period, it means that there is some idle time between those two packets, and in this case not much can be said apart from the fact that the rate of packet is lower than the available bandwidth. If two packets are part of the same congestion period and have similar congestion, the overall rate of probes between these two packets have a fairly neutral contribution to congestion, which means the overall rate of probes is close to the available bandwidth.

Usually, the congestion bump is composed of many packets, and there are many choices of packets that have similar OWD. The BDA may pick packets higher in the bump (packets with higher OWD) or lower in the bump (packets with lower OWD). If the BDA picks packets lower in the bump, where OWD is close to its uncongested value, it cannot distinguish properly congested from uncongested packets and it runs the risk that the selected packets are not in the same congestion period.

Conversely, picking packets higher in the bump may be problematic. The assumption that packets with similar OWD should have experienced similar congestion is only true at the onset of congestion, and very low levels of congestion. Some bottlenecks with cross traffic do not have symmetric behavior when going into congestion and decongestion, and in those cases, for medium to high congestion, packets with similar OWD do not have experienced similar congestion. Further, to avoid issue with the granularity of OWD, and to have a better averaging over time, it may be preferable to pick a pair of packets which is as far as possible, which equate to lower in the bump.

PathCos++ and SLDRT use different strategy in their BDA. PathCos++ tries to find the widest spaced pair of points with similar OWD on both sides of the bump. The assumption is that similar OWD indicates similar congestion. On the other hand, SLDRT uses the first packet of the train as the first packet of the pair. If then measures the minimum OWD minOWD, and defines a threshold thrOWD=minOWD+100 us. SLDRT picks for the second packet of the pair the packet immediately before the first packet below the threshold.

Other bandwidth estimation methods may use other algorithms. The most popular PRM method not using an EDA or BDA is PathLoad. For each rate to probe, PathLoad sends a sequence of packets at the rate. When the sequence of packet is received, PathLoad measures of IAT of packets. If the IAT is mostly equal to the IDT, PathLoad assumes that no congestion happened. If the IAT was increased, PathLoad assumes that congestion happened. PathLoad then uses that information to compute an estimate of available bandwidth.

There are other methods derived from on PathLoad, and their main characteristics are that they use chirp train of fixed rate and measure network delays using the IAT instead of the OWD.

An increase in OWD in the probe train in theory indicates increased congestion, however in reality OWD measurement are very noisy. This noise is due to the imperfection and non-ideal behavior of the various network elements and other packet scheduling constraints. Such noise in the OWD directly impacts the BDA algorithm. Noisy OWD values may lead the BDA to select two packets with similar OWD that in reality did not experience the same level of congestion, or packets that are not part of the same congested period. This may lead to improper available bandwidth estimate.

Testing reveals that the BDAs of PathCos++ and SLDRT have issues with typical OWDs measured on common network path. For example, on an idle Ethernet link, which is the best case scenario, the BDA has a fairly high error rate. Also, PathCos++ and SLDRT often underestimate the available bandwidth, and too often the pair of packets selected are not parts of the same congested period.

A large source of measurement noise is packet batching. Packet batching happens when in a queue, packet are processed as a group, instead of individually. This packet batching may impact the one way delay of packets drastically. The earlier packets of the group have to wait for the group to be processed and see their OWD artificially inflated, whereas the last packet of the group need to wait less and have a lower OWD. This may produce saw-tooth patterns in the measured OWD. Often, the strength of the saw-tooth pattern is close to the effect of congestion and is much greater than any other OWD noise.

Solutions may be implemented to address a common source of packet batching that might interrupt coalescence in the receiver Network Interface Card (NIC). The solution may rely on multiple packets per probe. A probe train is composed of a number of probes, each probe testing a specific rate on the network path. When mitigation is enabled, the sender sends multiple packets for each probe, instead of a single packet per probe. All packets of a probe are sent at the same rate, and therefore have the same IDT. The receiver filters packets and for each probe it selects only a single packet, the packet that is estimated to have suffered the least from packet batching. The BDA is only run on the selected packets, not on all received packets. This effectively filters packets to pick those at the bottom of the saw-tooth. In most cases, this greatly reduces the OWD noise, however most often it does not remove all OWD noise due to packet batching.

The definition of the IDT and IAT of a packet refers to the previous packet in the probe train. However, when packet batching mitigation is enabled, that packet is likely not part for the selected packets. For each selected packet, a Selected Inter Departure Time (sIDT) may be defined as the amount of time between sending the previous selected packet and sending this packet. We define Selected Inter Arrival Time (sIAT) as the amount of time between receiving the selected previous packet and receiving this packet. If there is no packet reordering, the sIAT, sIDT and OWD of each selected packets are directly related. If OWDps is the One Way Delay of the previous selected packet, and OWDcs the One Way Delay of the current packet, we have the formula:

sIAT=OWDcs−OWDps+sIDT

Rate limiters may be implemented to make sure that the traffic conforms to a certain rate to, ensure compliance with a contractual agreement or to smooth out the burstiness of the traffic. A rate limiter tries to enforce a long-term rate for the traffic passing through it, also called target rate or committed rate. However, traffic is both discrete (packets cannot be split) and bursty, so the rate limiter needs a mechanism for averaging enforcement. This may be accomplished using a token bucket (also referred to as a leaky bucket).

The token bucket is a container of virtual credits that are required in order to send a packet across the network path. For each packet presented for forwarding, a token must be available in the bucket. Each time a packet is forwarded, a token is removed from the bucket. Once the bucket is empty, there are no tokens to be removed and therefore packets cannot be forwarded until tokens are replenished. If the bucket is empty, the packet is either dropped or queued for later transmission. The token bucket is refilled with tokens at a constant rate, which is the desired target rate. The bucket has a maximum capacity, and when it's full, new tokens cannot be added. The size of the bucket is called the burst size, and reflects the permitted burst size. The token bucket smoothness and averages instantaneous variation in input traffic.

A token bucket may result in variations in the instantaneous output rate. If the input traffic rate was below the target rate for some time, the bucket becomes full. If new traffic arrives at the rate limiter, its output rate is unconstrained as long as tokens are available in the bucket, and this burst of packets can have a rate much higher than the target rate. This higher rate is referred to as the burst rate. Only when the bucket is empty, is target rate is enforced on the traffic, because this is when the traffic rate cannot exceed the rate of token replenishment.

Figure 3:
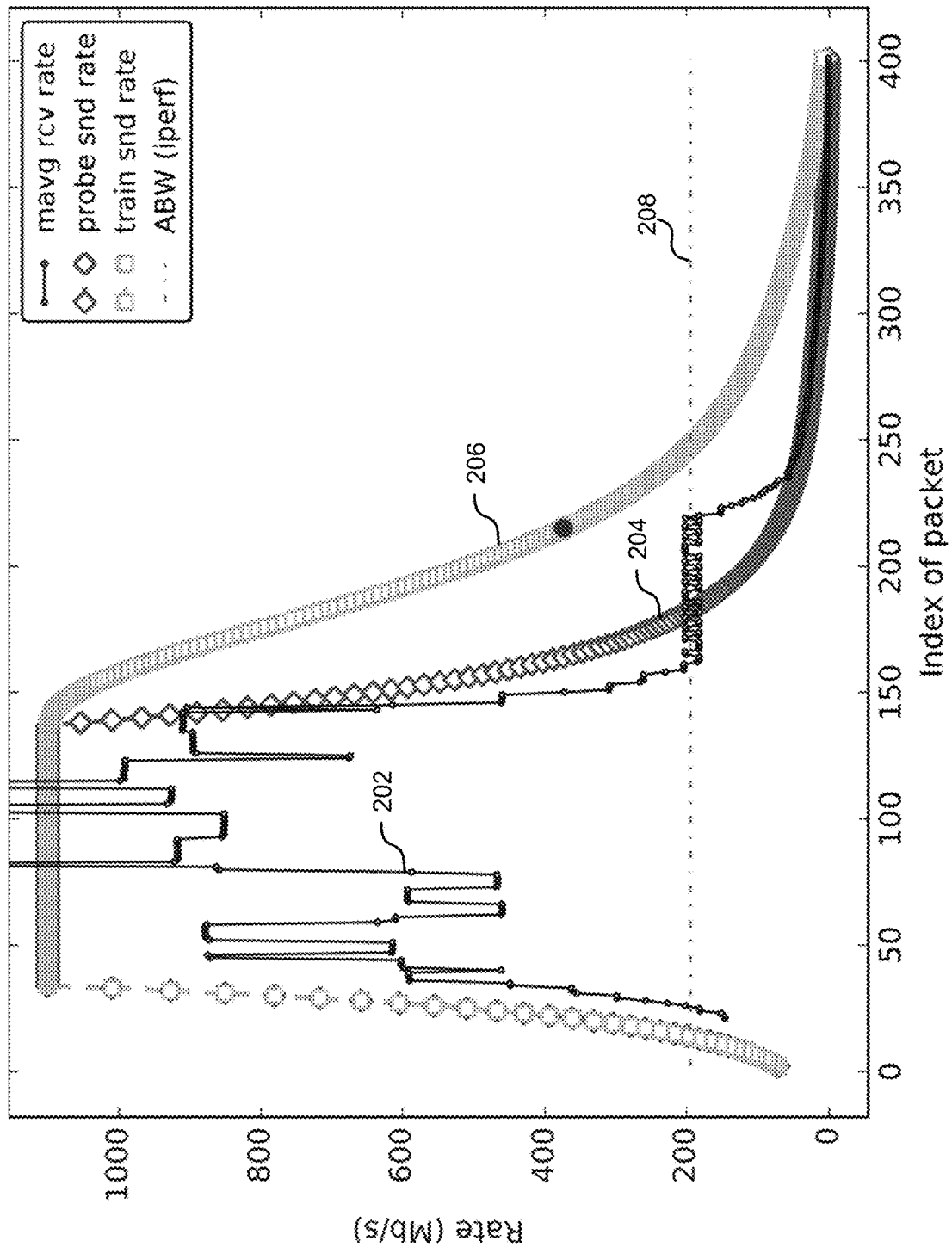
FIG. 3 illustrates an example of rate limiter bursting in terms of the receive rate in accordance with embodiments.

FIG. 3 illustrates an example of rate limiter bursting in terms of the receive rate in accordance with embodiments. Line 202 illustrates a moving average of the received rate. Line 204 illustrates a probe send rate and line 206 illustrates a train send rate. The ABW is illustrated by the dashed line at 208, and in this example is 200 Mb per second. In this example, the moving average of the received rate 202 may be computed as the inverse of the IAT. Probe send rate 204 may be computed as the IDT, reflecting how fast packets are being sent. Train send rate 206 measures the rate from the start of the train, as opposed to a probe rate that measures it from the previous probe. This is why the train rate decreases more slowly than the probe train rate 204.

Initially, the token bucket is full, so the rate may be (and in this example is) high and unstable during this period, the moving average of the received rate 202 exhibits large variations above ABW 208. Once the token bucket is exhausted at about index 150, new packets cannot be sent until a new token is received. Accordingly, moving average of the received rate settles into the ABW rate dictated by the token replenishment rate. This may be referred to as a long-term rate, and is shown at a packet index of about 155-225 where the moving averaged of the received rate matches ABW 208. Because the packet volume in this example decreases dramatically starting at about packet index 145, the network ultimately becomes decongested as shown at about packet index 220-400.

The example of FIG. 3 illustrates that packets may have short-term behavior due to the token bucket being initialized in a full state to accommodate bursts. In this example, the moving average of the received rate 202 may be computed as the inverse of the IAT.

Figure 4:
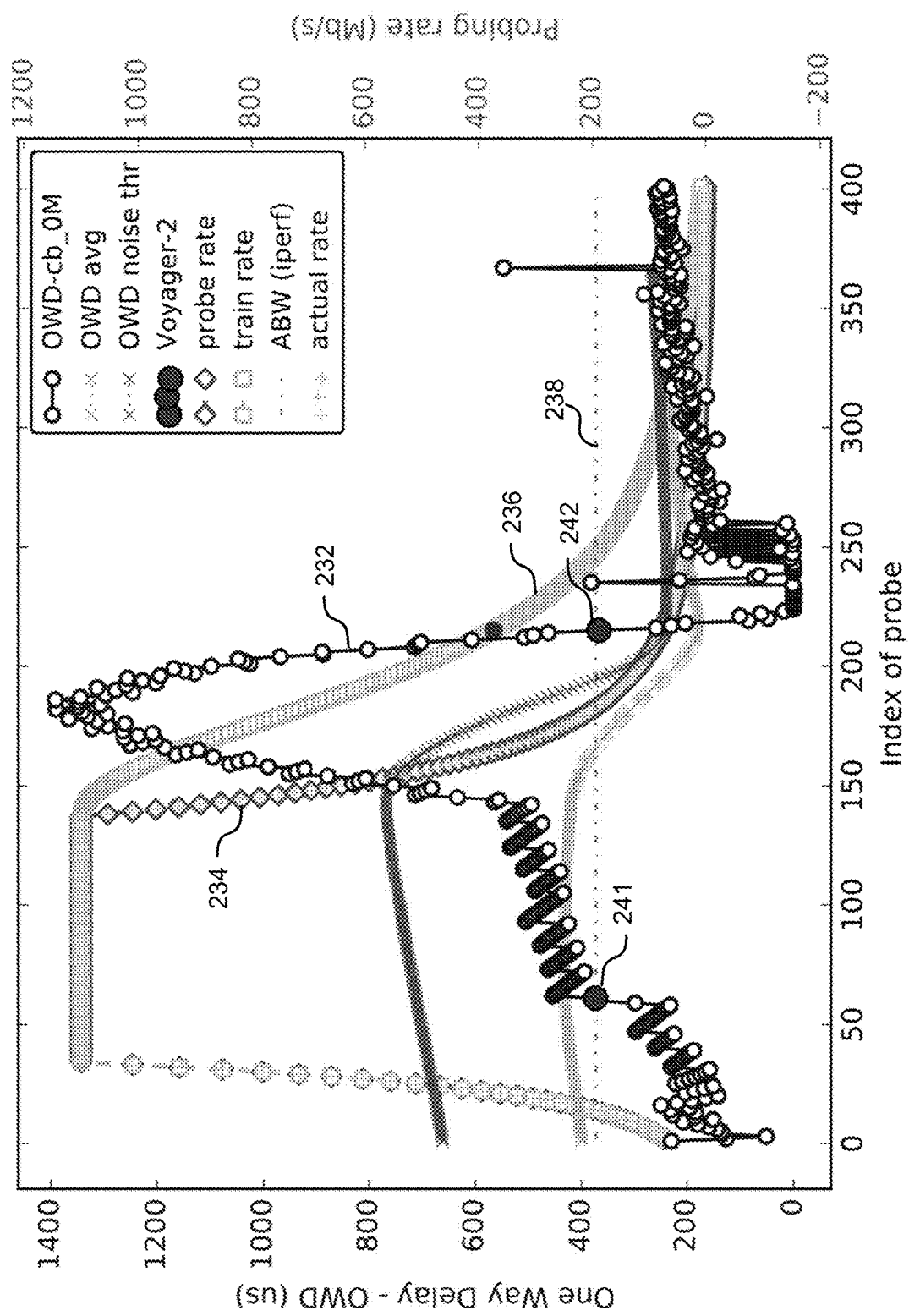
FIG. 4 illustrates an example of rate limiter bursting in terms of the receive rate in accordance with embodiments.

FIG. 4 illustrates an example of rate limiter bursting in terms of the one way delay (OWD) in accordance with embodiments. FIG. 4 illustrates short-term and long-term behavior in terms of OWD. In this example, line 232 illustrates the OWD. Line 234 illustrates the probe send rate and line 236 illustrates the train send rate, which are similar to lines 204 and 206, respectively, in FIG. 3.

As with FIG. 3, in the beginning when the bucket is full, the transmitter is allowed to burst. During bursting (between about probe index 50-150) an increase in OWD is experienced. Had an index of about 150, the bucket runs out of tokens, constraining packet transmission to the standard rate. Accordingly, packets are queued and the send rate slows. Accordingly, there is a strong increase in OWD as seen in line 232. Then, as the send rate begins to slow and fewer packets are being sent, the OWD also decreases.

Embodiments may perform available bandwidth estimation based on the OWE. However, as this example illustrates the OWD can present information that is not truly reflective of the available bandwidth. In accordance with embodiments, if two packets experience the same OWD, the system can conclude that the congestion remain the same and all contributions (packets sent) are equal to the available bandwidth of the network. Accordingly, embodiments can identify two points having a similar OWD, and measure the amount of traffic injected between those two points. Because the OWD remained the same, the packets must have been contribution neutral.

Embodiments may perform available bandwidth estimation based on the OWD. In this example, PathCos++ picks a pair probes 241, 242 on either side of the OWD bump. ABW methods with a decreasing rate try to find two probes with similar congestion, PathCos++ assumes that two probes with a similar OWD have a similar congestion, which in most cases is accurate. Other ABW estimation methods, such as SLDRT, rely on different assumptions and would have picked a different pair of probes 241, 242. Between two probes with similar congestion, the rate of probe is congestion neutral, and close to the ABW. After picking a pair of probes 241, 242, the ABW estimation method measures the sender rate or receiver rate of probes between the pair 242, 242, and uses it as the estimate of ABW. The first probe chosen, 241, was forwarded by the rate limiter during bursting, at the burst rate. The second probe chosen, 242, was forwarded after the burst at the standard rate. The rate of probes between 241 and 242 includes a section sent at burst rate, and a section sent a the standard rate. Therefore, it's average is significantly higher than the standard rate, and the final ABW estimate is also significantly higher than the standard rate, and therefore erroneous.

There are other implementations of Rate Limiters, Traffic Policers and Traffic Shapers. Some policers are hierarchical and based on multiple token buckets. Some token buckets have adaptive parameters or adaptive behavior. Two alternatives to token buckets are a sliding window and the Generic Cell Rate Algorithm (GCRA). All those algorithms have a behavior similar to a token bucket, in that they try to enforce a long-term target rate, but in the short term allow a burst of packets to be sent faster than the target rate. For the purpose of this disclosure, the behavior of those mechanisms is broadly similar to a token bucket, and may be considered as a form of token bucket.

Models used for available bandwidth estimation may assume that the path is stateless and timeless, and that the time scale of measurement does not matter. They assume that the behavior of the queues does not change and the capacity of the various links is constant. Any variation in available bandwidth is only due to variation in cross traffic. Rate limiters based on token buckets, however, violate this assumption. Those rate limiters have effectively two capacities. As seen in the examples illustrated in FIGS. 3 and 4, if the link has not been used or is being used below the target rate, tokens have accumulated in the bucket and packets may be forwarded at the burst rate, which is often much higher than the target rate. Once the bucket is empty, packets are forwarded at a rate that is no greater than the target rate.

The time the rate limiter allows forwarding at the burst rate tends to be very short, which mitigates its impact. However, it tends to have a disproportionate effect on ABW methods, especially when using short trains. Most applications and users are interested in the long-term ABW, related to the target rate, and don't care about the burst rate, therefore an aim of available bandwidth estimation in various embodiments is to estimate the long-term available bandwidth.

For increasing methods using an EDA, the rate of probes increase gradually. In an idle link, the first part of the train is below the target rate, and therefore does not drain the bucket. Once the probe rate exceeds the target rate, the bucket begins to drain. However, it usually takes many probes to drain the bucket, so those probes are still forwarded at burst rate and see no congestion and no OWD increase. At some point, the probes eventually drain the bucket, but at that point the probe rate has increased and now exceeds the target rate, causing overestimation. Therefore, methods that do not take this into account may return as the ABW estimate a value much closer to the burst rate than the target rate.

For decreasing methods using a BDA, a pair of probes is chosen, the first probe is close to the start of the chirp train, and the second probe is after the link decongests, and then the rate of probes between the pair of probes is measured. In a typical decreasing rate train on an idle link, the first part of the train is forwarded at the burst rate, until the bucket is empty, the second part is forwarded at the target rate, until the probe rate is below the target rate, and the later part of the train is forwarded at the probe rate (no congestion). If the train is very short, the second part may not even exist. The trailing probe is found at the boundary between the second and third part, therefore the measurement includes probes at the burst rate and probes at the target rate, and represent a weighted average between the burst rate and target rate, which overestimates the target rate. The number of probes at burst rate is usually dictated by the burst size, and the number of probes at target rate depends on the total number of probes sent faster than the target rate.

If the link has cross traffic that is below the target rate, both increasing and decreasing methods also overestimate ABW. The point at which the rate limiter goes from burst rate to target rate is different, and overestimation decreases as the cross traffic goes up. With a token bucket, cross traffic consumes tokens from the token bucket. As more traffic goes through the rate limiter, more tokens are used by the cross traffic, and fewer tokens are remaining in the bucket. This means that with higher cross traffic, less probe traffic is needed to consume the remaining tokens and transition the rate limiter to the long-term mode. In the extreme case, if the cross traffic rate is equal to or above the target rate, the bucket is empty and probes will always be forwarded at target rate. The behavior of most other types of rate limiter limiters is also dependent on the amount of cross traffic. In most cases, the amount of cross traffic fluctuates dynamically and cannot be predicted. Therefore the amount of probe traffic needed transition the rate limiter to the long-term mode varies and might not be fully known in advance.

The point at which the rate limiter goes from burst rate to target rate also depends on the rate at which probes arrive at the rate limiter. With a token bucket, during the time the probes arrive at the token bucket, the token bucket is being refilled with tokens, according to the target rate. The longer the probes take to arrive at the token bucket, the more tokens are added to the token bucket. If there is no cross traffic, to drain the full bucket, the number of probes must be equal to the bucket size plus the additional tokens added during that time. In the extreme case, if the rate of probes is equal to or below the target rate, the token bucket is refilled faster than it is drained, and the probe traffic will never drain the bucket. Other types of rate limiters will have similar behavior. The rate at which probe packets arrive at the rate limiter depends on the sending rate of probe packets and bottlenecks between the sender and the rate limiter. Those bottlenecks may be constrained by dynamic cross traffic, which is typically not possible to predict, and therefore the amount of probe traffic needed transition the rate limiter to the long-term mode varies and will not likely be fully known in advance.

For an idle link, the size of the preload should be larger than the rate limiter burst size. While the rate limiter is forwarding the preload packets, tokens keep accumulating in the bucket at rate target rate, and those need to be drained. A first order approximation of the preload size is:

preload-size=burst size*(1+target-rate/preload-rate)

If there is cross traffic, the cross traffic will help drain the bucket. An approximation of the preload size in this case is:

preload-size=burst size*(1+(target-rate−cross-rate)/preload-rate)

In practice, the number of packets needed to empty the rate limiter bucket can be directly measured over the network path, by measuring how many packets it takes to transition from burst rate to target rate. Measuring this quantity can allow embodiments to avoid having to know all the various rates and having to compute them. As noted above, this can also make embodiments compatible with network policers and network shapers that are not based on a token bucket. If those measurements are done using the chirp train, embodiments may further make the preload size slightly larger than this measured number, so that the change from burst rate to target rate can be detected reliably.

A simple way to reduce the overestimation due to capacity fluctuations is to increase the size of the chirp train. If there are vastly more probes sent at target rate than those sent at burst rate, the contribution of the probes at burst rate is reduced. However, this comes at the cost of additional probing overhead.

With a decreasing chirp train, the overestimation can be estimated from the ratio of probes at burst rate and target rate in the measurement, and the ratio of burst rate to target rate. With a decreasing chirp train, with burst rate twice the target rate, to get to less than 1% overestimation in ABW, the congested part of the chirp train must be greater than 100 times the burst size, so typically the total chirp train would be 200 times the burst size. Typical burst rates are much more than twice the target rate, increasing those multipliers. A small 5 KB burst size would require chirp trains exceeding 500 to 1000 packets. A larger 25 KB burst size would require chirp trains exceeding 2500 to 5000 packets.

Such large chirp trains may present issues. First, they increase overhead, and reduce useful capacity of the network path. Second, they increase congestion, that may cause other flows to slow down. Third, they increase processing cost, because there are more packets to process at the sender and receiver. Fourth, longer trains increase the probability of packet losses due to the extra congestion, and packet loss decrease the accuracy of most PRM methods.

Making the chirp train longer has the advantage of increasing the number of packets forwarded at target rate. However, measurements still do include a number of packets not forwarded at target rate, causing overestimation. Some solutions for decreasing chirp trains, measure the average IAT on the middle part of the chirp train and find the first packet that matches it. It can detect the transition from burst rate to target rate, and this enable the BDA to exclude the packets forwarded at burst rate, to select a pair of packets only amongst those forwarded at target rate and therefore to eliminate overestimation.

IAT fitting works well on fairly stable links, its effectiveness may decrease on noisy links or links with bursty cross traffic, so it does not work in all conditions. A limitation of the IAT fitting is that it only works if the packet forwarded at burst rate are less than 1/5th of the overall chirp train, otherwise the average IAT cannot be measured reliably. This means that the chirp train should to be somewhat large, a small 5 KB burst size would require chirp trains greater 35 packets, and a larger 25 KB burst size would require more than 175 packets.

Other techniques may be used to detect capacity changes that may perform better than IAT fitting. Rate Ratio Peak finds the largest difference between the rate before and after each packet. It usually detects capacity changes more reliably than IAT fitting and can be applied on much smaller chirp trains. A method to detect capacity change in the receive train is important for at least two reasons. First it allows precise removal of the packets forwarded at the burst rate from the received chirp train prior to AWB estimation, even when cross traffic fluctuates and changes the transition point of the rate limiter. Second, it enables computation of an average or typical number of packets needed to transition the rate limiter.

As noted above, embodiments may be implemented to preload the chirp train and provide a first packet preload to mitigate rate limiter bursting when using methods such as PRM. Embodiments may be implemented to send a number of packets prior to the chirp train or as part of the start of the chirp train to force the rate limiter into a long-term mode.

Embodiments may be implemented to reduce the ABW (available bandwidth) overestimation due to rate limiter bursting and improve available bandwidth estimation accuracy. Further embodiments may fit into existing EDA (excursion detection algorithm) or BDA (bump detection algorithm) of popular available bandwidth estimation methods. Embodiments may also be implemented such that they minimize CPU usage, network overhead and other overheads and minimize the size of the chirp train.

As noted above, capacity fluctuations cause overestimation because of bursting, where the initial packets of the chirp train are forwarded at the short-term burst rate rather than the long-term target rate. One way to combat rate limiter bursting is to increase the size of the chirp train, but this increases overhead, as described above.

Figure 5:
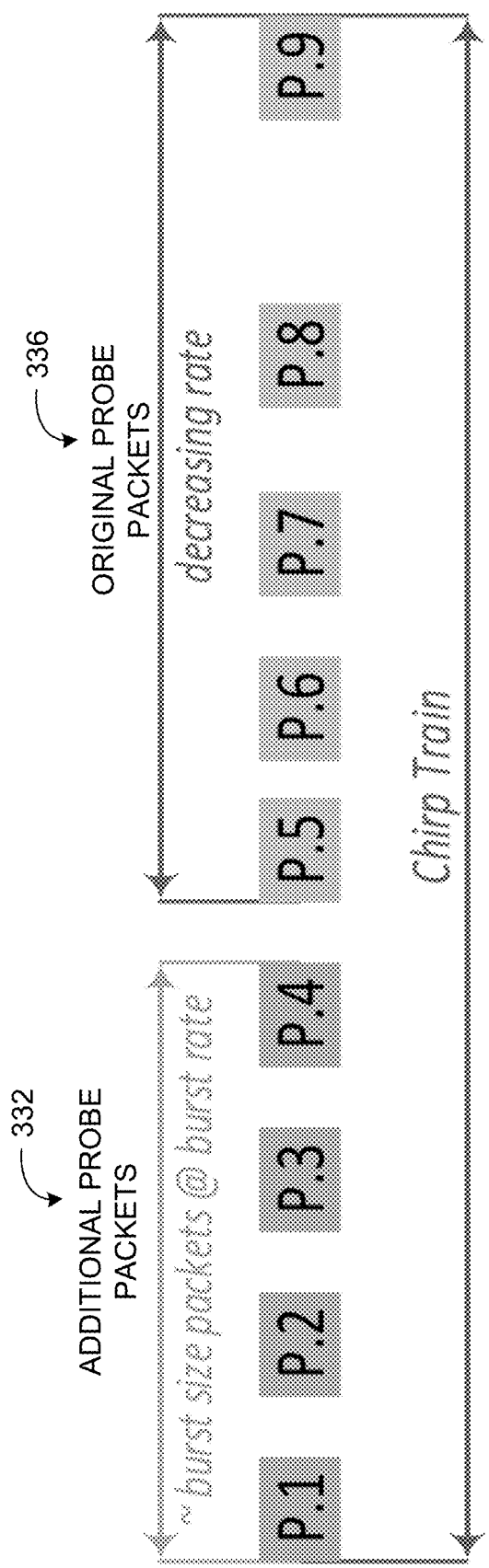
FIG. 5 illustrates an example of a chirp train with a burst preload before the original probe packets in the chirp train in accordance with embodiments.

Embodiments may be implemented to add additional packets before the original chirp train, without increasing the size of the original chirp train. The chirp train may then be composed of two parts, the pre-load portion and the original chirp train portion. FIG. 5 illustrates an example of a chirp train with a burst preload before the original probes in the chirp train. In this example, the burst preload 332 includes additional probe packets (or burst packets) P.1, P.2, P.3 and P.4, although other quantities of additional probe packets may be included in burst preload 332. Original probe packets 336 include the original chirp train, which in this example includes packets P.5, P.6, P.7, P.8 and P.9. Other quantities of packets may be included with original probe packets 336.

The original portion may be used for ABW estimation and may remain the same as before the preload was added (i.e., the same number of probes, and the same rates). The preload portion may have a dual use. It may be used to put the rate limiter into its long-term rate and can be used for ABW estimation. Accordingly, in various embodiments the size of the burst preload 332 is chosen to be approximately the burst size, and the rate of the preload is chosen to be approximately the burst rate. If burst preload 332 is optimally sized, this allows burst preload 332 to drain the bucket prior to the original part of the chirp train. Accordingly, when ABW estimation occurs, it is not making an estimation based on rate limiter bursting.

If the preload is optimally sized, the original part of the chirp train is forwarded by the rate limiter after the preload is forwarded and the bucket is drained by the preload. Therefore, the chirp train is forwarded entirely at the target rate. The original part of the chirp train does not include any probes forwarded at the burst rate, so overestimation may be avoided. This can be seen as an improvement over conventional technologies in that the estimation can be performed more accurately.

Accordingly, in various implementations the additional number of packets is constant and roughly equal to the burst size. In various embodiments, the additional number of packets can be much less than prior techniques. For example, for a small 5 KB burst size, the preload would be only 5 packets, and the whole chirp train could be 35 packets. For a larger 25 KB burst size, the preload would be 25 packets, and the whole chirp train could be 55 packets.

The sending rate for the preload should be fast enough to drain the bucket, and slow enough to not increase significantly the queue size and congestion. A faster rate minimizes the time and amount of data needed to drain the bucket, because there is less refilling of the bucket in the correspondingly shorter period of time. For this reason, a faster rate may be preferred. However, most PRM methods assume that the path is uncongested prior to measurement, so they require minimal congestion prior to the original part of the chirp train. If the preload creates significant congestion, this may negatively impact ABW estimation. For most PRM methods, congestion that is less than a few percent of the maximum congestion experienced in the original train is tolerable. To avoid congestion entirely, a rate slightly slower than the burst rate can be used. A rate slightly faster than the burst rate is another good option, when a slight increase of congestion can be tolerated. However, the path may be constrained on other links, forcing the system to use a preload rate lower than the burst rate.

The actual burst rate of the rate limiter is not necessarily known by the sender, and the constraints of the other links may not be known either. Therefore, embodiments may measure the burst receive rate, which is the average rate at which packets are received prior to the capacity change, and is mostly determined by the short-term rate of the network path. The burst receive rate is the fastest sender rate that will not create congestion on the path. The sending rate for the preload is slightly slower or slightly faster than the burst received rate, depending on the tolerance to congestion of the PRM method.

The number of probe packets to transition the rate limiter into its long-term mode may depend on more factors than just the burst size of the rate limiter for example, it also depend on cross traffic at the rate limiter and bottlenecks before the rate limiter. The cross traffic and bottlenecks may be dynamic, varying over time, and outside of system control. Accordingly they may be impossible to predict. For each chirp train, embodiments may be configured to select a size of the preload without knowing the state of the rate limiter when the chirp train will be forwarded. Therefore the preload may be too big or too small and the rate transition may not happen exactly between the preload portion and the original portion of the chirp train.

A simple preload technique may be implemented that adds special packets in front of chirp train to put it in the long-term rate, and those packets may be simply ignored and discarded before performing ABW estimation. However, the chirp train sender can't predict the state of the rate limiter, so a preload size may be chosen that is not optimal. If the preload size is too small, the target rate will not been reached based on the preload, and more probe packets are needed to transition the path to the long-term rate. If the preload size is too large, transition to long-term rate occurs before the end of the preload. As a result, the last portion of the preload is forwarded at the target rate, which creates congestion at the rate limiter. The burst rate is usually much higher than the target rate, so even a few packets sent around the burst rate can create significant congestion. Most PRM methods assume that the path is uncongested prior to measurement, so it is desired to have minimal congestion prior to the original part of the chirp train. In most cases, the congestion created by a preload that is too large may be significant enough to decrease accuracy of the ABW estimate.

Embodiments may address this issue by making the preload an integral part of the chirp train used for ABW estimation, and configuring the probe packets as packets than can be used for ABW estimation. Most receivers can detect in the chirp train the transition to the long-term rate, for example using IAT fitting or an alternative technique. Using such techniques, the receiver can identify the set of probes forwarded at the burst rate and eliminate them prior to performing ABW estimation. In some instances, this set of probes will be exactly the preload probes. This set of probes may be smaller or greater than the preload.

In various embodiments, the preload is a number of additional probe packets 332 that are added at the start of the chirp train. The preload may be added before the original probe packets 336, and the number of packets and the rate of packets in the original chirp train may be determined by the ABW method in use. In some embodiments, the additional probe packets 332 may be used for ABW estimation. The receiver may be configured to detect a capacity change on the received chirp train to determine which additional probe packets 332 of the preload to use for ABW estimation. For example, the number of packets in the preload may be determined by detecting capacity changes on some received chirp train. In some embodiments, the rate of packets in the preload may be determined by the receive rate of packets prior to a capacity change measured on the received chirp train.

Figure 6:
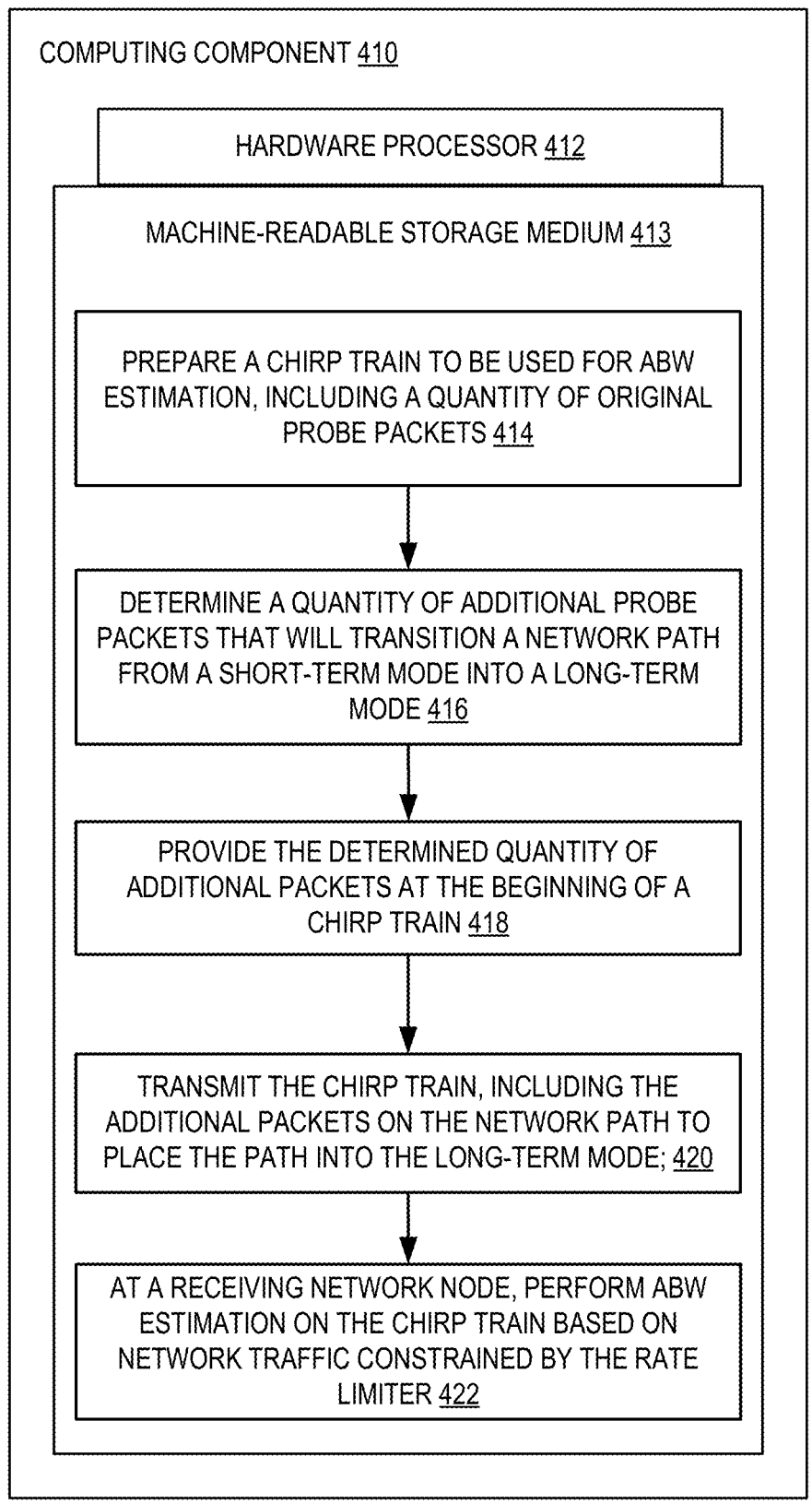
FIG. 6 illustrates an example computing component that may be used to implement burst preloading for available bandwidth estimation in accordance with various embodiments.

FIG. 6 illustrates an example computing component that may be used to implement burst preloading for available bandwidth estimation in accordance with various embodiments. Referring now to FIG. 6, computing component 410 may be, for example, a server computer, a controller, or any other similar computing component capable of processing data. In the example implementation of FIG. 6, the computing component 410 includes a hardware processor 412, and machine-readable storage medium for 14.

Hardware processor 412 may be one or more central processing units (CPUs), semiconductor-based microprocessors, and/or other hardware devices suitable for retrieval and execution of instructions stored in machine-readable storage medium 413. Hardware processor 412 may fetch, decode, and execute instructions, such as instructions 414-422, to control processes or operations for burst preloading for available bandwidth estimation. As an alternative or in addition to retrieving and executing instructions, hardware processor 412 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 314, may be any electronic, magnetic, optical, or other physical storage device that contains or stores executable instructions. Thus, machine-readable storage medium 413 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 413 may be a non-transitory storage medium, where the term "non-transitory" does not encompass transitory propagating signals. As described in detail below, machine-readable storage medium 413 may be encoded with executable instructions, for example, instructions 414-422.

Hardware processor 412 may execute instruction 414 to cause the system to prepare a chirp train to be used for ABW estimation. The chirp train may include a quantity of original probe packets for ABW. Embodiments may be configured to use chirp trains designed to exercise the network path in specific ways. Different ABW estimation methods may use different chirp trains, and may typically specify parameters such as the number of packets in the chirp train, the packet size and the packet rate of each packet. For example, methods using an EDA have chirp trains with increasing rates over the chirp train, whereas methods using a BDA have chirp trains with decreasing rates over the chirp train.

Hardware processor 412 may execute instruction 416 to cause the system to determine a quantity of preload packets that will transition a network path from a short-term mode into a long-term mode. In embodiments, the number of packets needed to transition from short-term behavior to the long-term target rate is mostly consistent, and may be referred to as the burst size. In some embodiments, the number of preload packets can be directly measured over the network path, for example by detecting capacity changes on received chirp trains. The rate at which those packets are forwarded is mostly consistent, and may be referred to as the burst rate. In some embodiments, the preload rate can be directly measured over the network path, by looking at the rate of received packets. The measurement of the burst size and burst rate over the network path may enable implementations that avoid having to know the configuration of the token bucket, and that are compatible with network policers and network shapers that are not based on token bucket.

Hardware processor 412 may execute instruction 418 to cause the system to provide the determined quantity of additional probe packets (e.g., preload packets) at the beginning of the chirp train. An example of this is illustrated a FIG. 5 in which four packets P.1, P.2, P.3 and P.4 are added as part of the burst preload 332 in front of original probe packets 336.

Hardware processor 412 may execute instruction 420 to transmit the chirp train across the network path. As noted above, this may include the preload packets being transmitted ahead of the original chirp train packets to place the network path into its long-term mode. In various embodiments, the path is in the long-term mode when the network traffic is rate constrained by the rate limiter. As noted in the example of FIG. 5, the chirp train includes additional probe packets as part of burst preload 332 and original chirp train probe packets as part of original probe packets 336. The additional probe packets may be sent at the preload rate, which is usually different from the rates used in the normal part of the chirp train.

Hardware processor 412 may execute instruction 422 to perform ABW estimation at the receiving node. As noted above, embodiments perform ABW estimation on the original probe packets of the chirp train and not on the additional probe packets. As described above, in various embodiments the extra packets are added ahead of the chirp train and ignored by the receiver. The preload size depends on the rate of cross traffic, and the rate of cross traffic varies over time and is not predictable. This means that with varying cross traffic, the preload is may at times be a bit too short, while other times it may be a bit too long. If the preload is too short, this causes overestimation as the bucket hasn't been drained and the rate limiter is not kicked in. On the other hand, if the preload is too long, the preload packets themselves add congestion before ABW estimation that can increase errors in some conditions. Accordingly, the preload size can be determined dynamically based on the current rate of cross traffic.

Embodiments may implement techniques to ignore preload packets for purposes of ABW estimation under various circumstances, and to use some of the preload packets for ABW estimation. For example, embodiments may be configured to ignore preload packets forwarded at the burst rate. Further embodiments may be implemented to detect and identify the transition between burst rate and target rate using, for example, IAT fitting and may be configured to ignore these probes (e.g., as described above). Still further embodiments may use Rate Ratio Peak (e.g., as described above) to detect the capacity change on the received chirp train and ignore the probes prior to the measured Rate Ratio Peak.

The preload packets, instead of being special packets, may be implemented as an additional set of probes added to the beginning of the chirp train to deal with the case where the preload is too long. Conversely, if the preload is too short, it's possible for some of the original probes to be ignored. The advantage is that if the probe train is a bit too short or a bit too long, it does not matter, receiver uses a capacity change detector to determine which set of received probes to exclude and which to use, minimizing error.

In embodiments, the preload probes may be treated exactly similar to the normal probes. In embodiments, the addition of burst preload probes to a decreasing chirp train changes the train rate of each probe, so this looks different from a normal increase in the chirp train length. The quantity of preload packets may be directly dictated by the measurement of capacity change over the network path.

Figure 7:
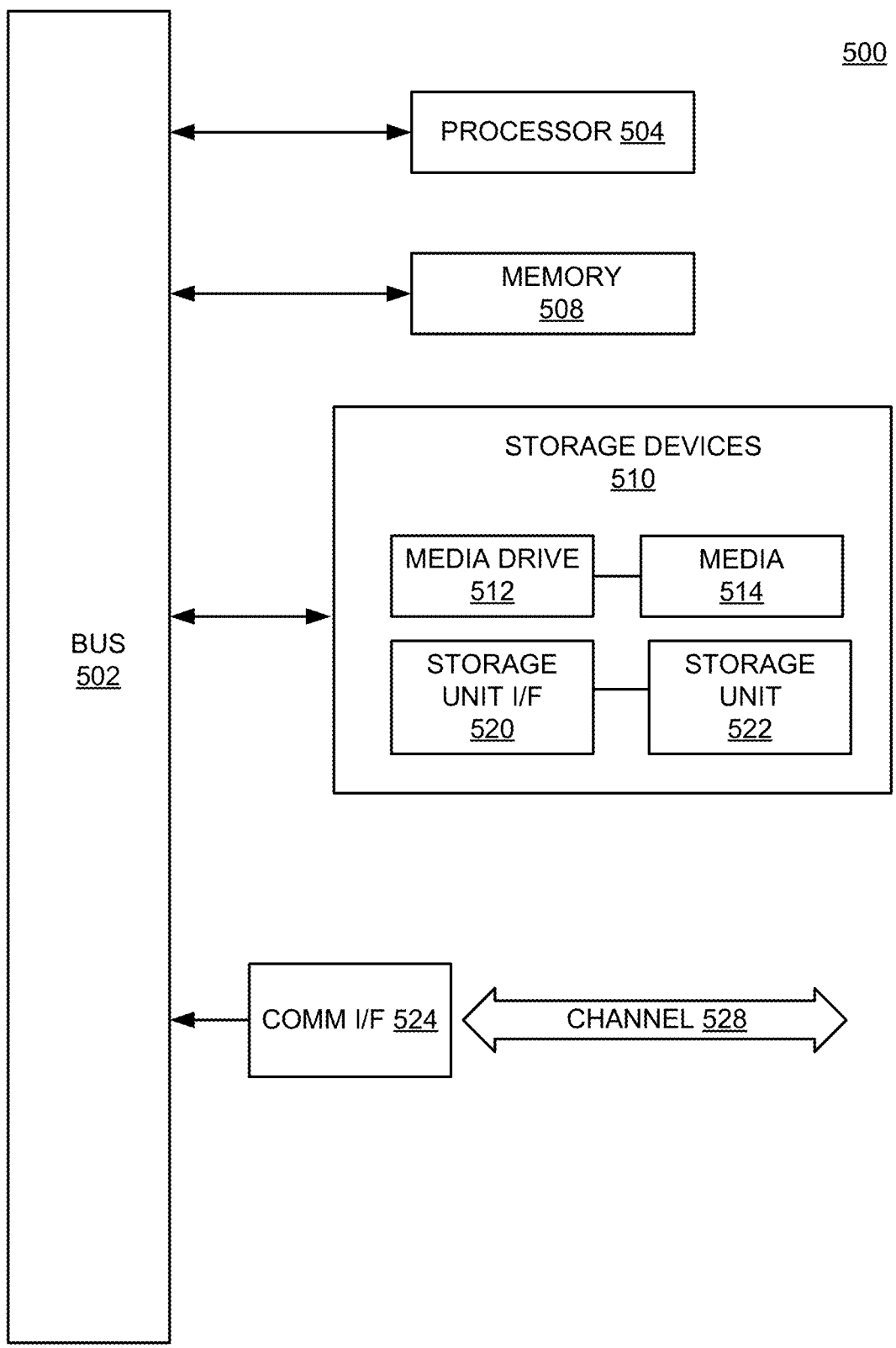
FIG. 7 is an example computing system that may be used to implement various features of embodiments described in the present disclosure.

FIG. 7 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for performing burst packet preloading for Available Bandwidth (ABW) estimation of a network path, comprising:
    preparing a chirp train to be used for ABW estimation, the chirp train comprising a quantity of original probe packets;
    determining a quantity of additional probe packets that will cause a rate limiter on the network path to enforce a long-term rate on the network path;
    inserting the determined quantity of additional probe packets at the beginning of the chirp train; and
    transmitting the chirp train, including the determined quantity of additional probe packets on the network path, to a receiver configured to perform ABW estimation of the network path, wherein transmitting the chirp train comprises transmitting the determined quantity of additional probe packets at a fixed first rate and transmitting the original probe packets at a varying second rate.

2. The method of claim 1, wherein, when the chirp train is received at the receiver, the ABW estimation performed by the receiver is performed based on network traffic constrained by the rate limiter or by a traffic shaper.

3. The method of claim 1, wherein the determined quantity of additional probe packets comprises a quantity of additional probe packets which, when added to cross traffic on the network, will cause the rate limiter to enforce the long-term rate on the network path.

4. The method of claim 1, wherein the ABW estimation performed by the receiver is performed on the original probe packets and not on the additional probe packets.

5. The method of claim 1, wherein the ABW estimation is performed by the receiver on a subset of the additional probe packets.

6. The method of claim 1, wherein the receiver is further configured to detect a capacity change on the chirp train and to use the capacity change to determine which additional probe packets to use for the ABW estimation.

7. The method of claim 1, wherein the ABW estimation is performed by the receiver using the original probe packets and a trailing subset of the additional probe packets, wherein the trailing subset is determined based on capacity measurements on the received chirp train.

8. The method of claim 1, wherein the quantity of additional probe packets is a quantity of packets that will transition the network path to a rate constrained path.

9. The method of claim 1, wherein the quantity of additional probe packets is determined dynamically based on measurements of the network path.

10. The method of claim 1, wherein the varying second rate of transmitting the original probe packets is determined by the ABW estimation process performed by the receiver, and the fixed first rate of transmitting the additional probe packets is determined by a short-term rate of the network path.

11. A network node for performing burst packet preloading for Available Bandwidth (ABW) estimation, the network node comprising:
    a processor; and
    a memory unit operatively connected to the processor, the memory unit including instructions that when executed by the processor, cause the training node to perform the operations of:

preparing a chirp train to be used for ABW estimation, the chirp train comprising a quantity of original probe packets;

determining a quantity of additional probe packets that will cause a rate limiter on the network path to enforce a long-term on the network path;

inserting the determined quantity of additional probe packets at the beginning of a chirp train; and transmitting the chirp train, including the determined quantity of additional probe packets on the network path, to a receiving network node configured to perform ABW estimation of the network path, wherein transmitting the chirp train comprises transmitting the determined quantity of additional probe packets at a fixed first rate and transmitting the original probe packets at a varying second rate.

12. The network node of claim 11, wherein, when the chirp train is received at the receiving network node, the ABW estimation performed by the receiving network node will be performed based on network traffic constrained by the rate limiter or by a traffic shaper.

13. The network node of claim 11, wherein the determined quantity of additional probe packets comprises a quantity of additional probe packets which, when added to cross traffic on the network, will cause the rate limiter to enforce the long-term rate.

14. The network node of claim 11, wherein the ABW estimation is performed on the original probe packets and not on the additional probe packets.

15. The network node of claim 11, wherein the ABW estimation is performed on a subset of the additional probe packets.

16. The network node of claim 11, wherein the receiving network node is configured to detect a capacity change on the chirp train and to use the capacity change to determine which additional probe packets to use for the ABW estimation.

17. The network node of claim 11, wherein the quantity of additional probe packets is a quantity of packets that will transition the network path to a rate constrained path.

18. The network node of claim 11, wherein the quantity of additional probe packets is determined dynamically based on measurements of the network path.

19. The network node of claim 11, wherein the ABW is performed using the original probe packets and a trailing subset of the additional probe packets.

20. The network node of claim 11, wherein the varying second rate of transmitting the original probe packets is determined by the ABW estimation process performed by the receiving network node, and the fixed first rate of transmitting the additional probe packets is determined by a short-term rate of the network path.

* * * * *